United States Patent [19]
Hawley et al.

[11] Patent Number: 5,362,825
[45] Date of Patent: Nov. 8, 1994

[54] CATALYSTS FOR POLYMERIZING OLEFINS AND METHODS

[75] Inventors: Gil R. Hawley, Dewey; Max P. McDaniel; Jesse R. Harris, both of Bartlesville; David R. Battiste, Bartlesville, all of Okla.

[73] Assignee: Phillips Petroleum Company, Bartlesville, Okla.

[21] Appl. No.: 912,351

[22] Filed: Jul. 13, 1992

[51] Int. Cl.$^5$ ............... C08F 4/654; C08F 4/44; B01J 21/16
[52] U.S. Cl. ................ 526/125; 526/119; 502/62; 502/63; 502/84
[58] Field of Search ............. 502/62, 84, 63; 526/119, 125

[56] References Cited

U.S. PATENT DOCUMENTS

| | | | |
|---|---|---|---|
| 4,060,480 | 11/1977 | Reed et al. | 208/111 |
| 4,173,547 | 11/1979 | Graff | 252/429 B |
| 4,176,090 | 11/1979 | Vaughan et al. | 252/455 Z |
| 4,248,738 | 2/1981 | Banasiak | 252/431 R |
| 4,391,736 | 7/1983 | Capshew | 252/429 B |
| 4,394,291 | 7/1983 | Hawley | 252/429 B |
| 4,719,271 | 1/1988 | Dietz | 526/114 |
| 4,963,518 | 10/1990 | Landau et al. | 502/62 |
| 5,024,982 | 6/1991 | Hawley et al. | 502/110 |

FOREIGN PATENT DOCUMENTS

| | | | |
|---|---|---|---|
| 2000508 | 7/1971 | Germany | 502/62 |
| 2176772 | 1/1987 | United Kingdom | 502/62 |

Primary Examiner—Carl F. Dees
Attorney, Agent, or Firm—Edward L. Bowman

[57] ABSTRACT

Pillared clay based high activity olefin polymerization catalysts, methods of producing the catalysts and methods of using the catalysts in the polymerization of olefins are provided. The methods of producing the catalysts each basically comprise contacting a pillared clay with the soluble complex produced by heating a mixture of a metal dihalide with a transition metal compound to produce a solid, and then reacting the solid with an organoaluminum halide. The process produces catalyst components shaped like dipyramidal or generally "football"-shaped crystals.

27 Claims, No Drawings

CATALYSTS FOR POLYMERIZING OLEFINS AND METHODS

BACKGROUND OF THE INVENTION

1. Field of the Invention

The present invention relates to olefin polymerization catalysts and methods of producing and using the catalysts, and more particularly, to olefin polymerization catalysts prepared from mixtures of transition element compounds and organometallic compounds.

2. Description of the Prior Art

It is known to polymerize α-olefins and mixtures thereof at low pressures with coordination catalysts prepared from mixtures of transition element compounds and organometallic compounds.

In the polymerization of ethylene and propylene, it is desirable to perform the polymerization reaction in an inert diluent at a temperature at which the resulting polymer or copolymer is relatively insoluble in the reaction medium. Also, it is desirable that the polymer so produced does not require additional processing to remove catalyst residue therefrom. In order to achieve the foregoing, a polymerization catalyst must be employed which is capable of producing polymer in a high productivity whereby the residual catalyst level in the recovered polymer is maintained at a very low level. It is also desirable that the catalyst bring about the production of polymer particles which are characterized by strength, uniformity of size, and a relatively low level of fine particulate material.

Olefin polymerization catalysts of the type described above prepared from mixtures of transition element and organometallic compounds have been developed and utilized which achieve, in varying degrees, the desired results described above. For example, U.S. Pat. No. 4,394,291 issued Jul. 19, 1983 discloses an olefin polymerization catalyst prepared by reacting a metal dihalide with one or more transition metal compounds and reacting that product with a certain organoaluminum compound. The resulting catalyst, with or without a cocatalyst, achieves high enough productivity that catalyst residue contained in the produced polymer is low enough to not significantly affect the polymer properties.

U.S. Pat. No. 4,719,271 issued Jan. 12, 1988 discloses a polymerization catalyst similar to that described above, i.e., a catalyst prepared by reacting a metal dihalide with a transition metal compound and reacting that product with an organoaluminum compound. The catalyst is prepared in the presence of a particulate diluent, e.g., polymeric fibrils.

U.S. Pat. No. 5,024,982 issued May 28, 1991 discloses yet another coordination catalyst, in this case prepared by contacting a soluble complex produced by contacting a metal dihalide with a transition metal compound in the presence of particulate silica. The resulting composition is then contacted with an organoaluminum halide to produce a high activity olefin polymerization catalyst.

Thus, there has been and continues to be a search for catalysts useful in the polymerization of α-olefins which result in high polymer productivity and produced polymers having high strength, a uniformity of size, and a relatively low level of catalyst residue therein. By the present invention, improved high activity olefin polymerization catalysts, methods of producing the catalysts and methods of using the catalysts are provided which achieve desirable results in the above described areas.

SUMMARY OF THE INVENTION

In accordance with the present invention, an improved high activity olefin polymerization catalyst is produced by contacting a pillared clay with the soluble complex produced from a mixture of a metal dihalide with at least one transition metal compound in the presence of a liquid diluent. The resulting mixture is in turn contacted with an organoaluminum halide to produce the catalyst.

The pillared clay is preferably prepared by reacting smectite clay with an aqueous solution of a polymeric cationic hydroxy metal complex, drying the solid product produced and then calcining the product. The soluble complex with which the pillared clay is contacted is preferably produced by heating a mixture of magnesium dichloride with a titanium alkoxide and phenol in xylene. After the pillared clay is contacted with the complex to produce a solid, the solid is preferably contacted with ethylaluminum sesquechloride to produce the catalyst. In a more preferred method, the catalyst is additionally contacted with an activating agent selected from the group consisting of a titanium halide, a silicon halide, a halogenated silane and mixtures of the titanium halide with one or more of the silicon compounds.

Catalysts prepared in accordance with the above described method, and methods of polymerizing olefins utilizing the catalysts are also provided by the present invention. In the method of polymerizing olefins with a catalyst of this invention, a cocatalyst can be utilized therewith, preferably a cocatalyst comprising triethylaluminum. It is, therefore, a general object of the present invention to provide improved olefin polymerization catalysts and methods of producing and using such catalysts. A further object of the present invention is the provision of improved high activity olefin polymerization catalysts which have high olefin polymer productivity and result in polymers having high strength, uniformity of size, and a low level of residual catalyst therein. Other and further objects, features and advantages of the present invention will be readily apparent to those skilled in the art upon a reading of the description of preferred embodiments which follows. The inventive process for producing the catalyst results in dipyramidal-shaped catalyst particles which produces dipyramidal or fused dipyramidal-shaped polymer particles.

DESCRIPTION OF PREFERRED EMBODIMENTS

The catalyst of the present invention comprises a complex resulting from the chemical combination of a metal dihalide and at least one transition metal compound. The complex is contacted with a particulate pillared clay and further reacted with an organoaluminum halide.

The catalyst is produced by contacting the pillared clay with the soluble complex produced by combining a metal dihalide with at least one transition metal compound in the presence of a diluent to produce a slurry, the pillared clay being present in an amount in the range of from about 0.1% to about 30% by weight based on the weight of the soluble complex; and then contacting the slurry produced with an organoaluminum halide in an amount in the range of from about 0.1 mole to about 10 moles per mole of transition metal compound in the slurry to produce the catalyst.

As will be described in detail below, the pillared clay is preferably prepared by reacting smectite clay with an aqueous solution of a polymeric cationic hydroxy metal complex. After drying, the pillared clay is calcined in air at an elevated temperature.

In addition to the metal dihalide and at least one transition metal compound utilized for forming the solid complex deposited on the silica support, a third component can be included to provide increased productivity and/or greater selectivity. Also, after being contacted with the organo-aluminum halide, the solid catalyst formed can be reacted with one or more halogen containing compounds.

The metal dihalide utilized is preferably selected from compounds containing metals of Groups IIA and IIB of the Periodic Table. Examples of such metals are beryllium, magnesium, calcium, and zinc. Magnesium dichloride is presently preferred because it is readily available, inexpensive and provides excellent results. While both the hydrous and anhydrous forms of the metal dihalide can be employed in accordance with the present invention, it is desirable that the amount of water in the metal dihalide be from 0.5 to 1.5 moles per mole of metal dihalide prior to contacting the metal dihalide with the transition metal compound. Methods known to those skilled in the art can be utilized to limit the amount of water to an amount within the range given above. If anhydrous metal dihalide is utilized, it is preferred that an appropriate amount of water is mixed with the anhydrous metal dihalide prior to contacting the transition metal compound therewith.

The metal dihalide component is preferably in a fine particulate solid form to facilitate its reaction with the transition metal compound. Various conventional techniques for converting a solid metal dihalide compound to fine particulate form can be utilized, such as roll milling, reprecipitating, etc.

The transition metal compounds which are useful in accordance with this invention are those wherein the transition metal is selected from the groups IVB and VB of the Periodic Table, and the transition metal is bonded to at least one atom selected from the group consisting of oxygen, nitrogen and sulfur with the oxygen, nitrogen and sulfur atoms being bonded to a carbon atom of a carbon-containing radical. The transition metal is preferably selected from titanium, zirconium and vanadium. Excellent results have been obtained with titanium compounds and they are therefore preferred. Examples of such compounds which can be used in accordance with this invention are titanium tetrahydrocarbyloxides, titanium tetraimides, titanium tetraamides and titanium tetramercaptides. Other transition metal compounds which can be used include, for example, zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

Titanium tetrahydrocarbyloxides are presently preferred because they produce excellent results and are readily available. Preferred titanium tetrahydrocarbyloxide compounds include those represented by the general formula $Ti(OR)_4$ wherein each R is individually selected from alkyl, cycloalkyl, aryl, alkaryl, and aralkyl hydrocarbon radicals containing from about 1 to about 20 carbon atoms, and each R can be the same or different. Titanium tetrahydrocarbyloxides in which the hydrocarbyl group contains from about 1 to about 10 carbon atoms per radical are more frequently employed because they are more readily available. Suitable titanium tetrahydrocarbyloxides include, for example, titanium tetramethoxide, titanium dimethoxidediethoxide, titanium tetraethoxide, titanium tetra-n-butoxide, titanium tetrahexyloxide, titanium tetradecyloxide, titanium tetra-ecosyloxide, titanium tetracyclohexyloxide, titanium tetrabenzyloxide, titanium tetra-p-tolyoxide and titanium tetraphenoxide. Of these, titanium tetraalkoxides are generally preferred, and titanium tetra-n-butoxide is particularly preferred because of the excellent results obtained.

The mole ratio of the transition metal compound to the metal dihalide compound can vary over a relatively broad range. Generally, the mole ratio is within the range of about 10:1 to about 1:10. The most commonly used mole ratio is within the range of from about 2:1 to about 1:2. When the titanium compound is a titanium tetrahydrocarbyloxide and the metal dihalide is magnesium dihalide, a mole ratio of titanium to magnesium of about 1:2 is preferred.

The metal dihalide compound and the transition metal compound employed in the present invention are normally mixed together and heated in a suitable dry solvent or diluent that is essentially inert to the reactants and product. Suitable inert solvents or diluents include, for example, n-pentane, n-heptane, methylcyclo- hexane, toluene, xylenes and the like. Aromatic solvents, such as xylene, are preferred because the solubilities of the metal dihalide compound and transition metal compound are higher in aromatic solvents than aliphatic solvents, particularly at low mixing temperatures.

The amount of diluent employed can also vary over a broad range. Usually, the diluent is present in an amount in the range of from about 20 cc to about 100 cc per gram of metal dihalide utilized. The temperature to which the metal dihalide, transition metal compound and diluent mixture are mixed is normally within the range of from about 0° C. to about 150° C. when the mixing is carried out at atmospheric pressure or more preferably about 15° C. to about 100° C. Higher heating temperatures and pressures above atmospheric can be employed. The time over which the mixture is mixed generally varies within the range of from about 5 minutes to about 10 hours. In most instances, a time within the range of from about 15 minutes to about 3 hours is sufficient. Following the mixing step, the resulting mixture containing a dissolved reaction complex can be filtered to remove any undissolved material if desired.

As mentioned above, in a preferred embodiment of the present invention, a third component in addition to the metal dihalide and transition metal compound is included in the reaction mixture. The third component can be a single compound or a mixture of compounds to provide improvements in productivity or selectivity as desired. Examples of compounds that can be used as a third component are electron donors such as ammonia, hydroxylamine, alcohols, ethers, carboxylic acids, esters, acid chlorides, amides, nitriles, amines, and substituted and unsubstituted phenols, naphthols and their sulfur-containing analogs, i.e., thiophenols. The preferred such compounds are aromatic compounds selected from the group consisting of phenols, thiophenols, naphthols, aralkyl alcohols, aromatic acids, and aromatic esters. Of these, a phenol or aromatic ester or both are preferred. The mole ratio of the third component employed relative to the transition metal compound can vary from about 5:1 to about 1:5, preferably a mole ratio of third component to transition metal compound of about 1:1 to 2:1 is employed.

The metal dihalide compound, transition metal compound and optional third component compound or compounds can be reacted in a solvent or diluent to form the soluble complex as described above, or, when one or more of the reactant compounds are in the liquid state during the reaction, the use of a solvent or diluent can be omitted.

The soluble complex prepared as described above is contacted with a particulate pillared clay composition. The particulate pillared clay preferably has a particle size in the range of from about 50 to about 200 microns, and can be prepared by reacting a smectite clay such as bentonite with an aqueous solution of a polymeric cationic hydroxy metal complex. A preferred such complex is an aluminum chlorohydroxide complex with is commercially available under the tradename Chlorhydrol ® from the Reheis Chemical Company of Berkeley Heights, N.J. A particularly suitable aqueous solution of such an aluminum chlorohydroxide complex contains about 2.3% by weight of the complex and about 97.7% by weight distilled water.

The slurry produced by the reaction of smectite clay and the aqueous solution of polymeric cationic hydroxy inorganic metal complex utilized is recovered, washed with distilled water, dried and calcined. Preferably, the calcination is carried out at a temperature of from about 200° C. to about 800° C., preferably about 500° C., for a time period of from about 1 hour to about 4 hours, preferably about 2 hours. The resulting pillared clay material comprises a smectite clay which includes an inorganic oxide, e.g., alumina, between the clay layers. The inorganic oxide is present in the form of pillars which separate and support the clay layers at a uniform distance of about 6 to about 16 angstroms. The pillared clay material is a microporous material having most of the surface area in the interlayer regions. Pillared clay materials are described in detail, for example, in U.S. Pat. No. 4,248,739 issued Feb. 3, 1981 which is incorporated herein by reference.

The amount of the particulate pillared clay employed in the practice of the present invention, based on the weight of soluble complex contacted by the pillared clay can vary over a wide range. Generally, however, the weight of particulate pillared clay employed can range from about 0.1% to about 30% by weight based on the weight of the soluble complex, with about 20% by weight being preferred.

The desired amount of pillared clay is added to the solution containing the soluble complex with stirring at a suitable temperature for a suitable period of time. Generally, the contact of the soluble complex with the pillared clay is for a time period in the range of from about 5 minutes to about 2 hours at a temperature in the range of from about 20° C. to about 100° C.

The slurry produced by the contact of the pillared clay with the soluble complex is next contacted with an organoaluminum halide. The organoaluminum halide is selected from compounds having the general formula $AlR_nX_{3-n}$ wherein each R is individually selected from saturated and unsaturated hydrocarbon radicals containing 1 to 20 carbon atoms per radical, X is a halogen and n is a number equal to or between 1 and 2. Examples of such organoaluminum halides include methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-p-propylaluminum bromide, di-n-octylaluminum bromide, diphenylaluminum chloride, dicyclohexylaluminum bromide, diecosylaluminum chloride, methylaluminum sesquibromide, ethylaluminum sesquichloride, ethylaluminum sesquiiodide, and the like, and mixtures thereof. Ethylaluminum sesquichloride, ethylaluminum dichloride, and diethylaluminum chloride have been employed with good results. The most preferred organoaluminum halide is ethylaluminum sesquichloride.

The reaction with the organoaluminum halide can be carried out either in the presence of a liquid diluent or in the absence of such diluent. Preferably, the pillared clay after contact with the reaction product of the metal dihalide, the transition metal compound and optionally, a third component, e.g., phenol, is contacted with a hydrocarbon solution of the organoaluminum halide. The temperature employed during the contact can vary over a broad range. Generally, the temperature employed is within the range of from about 0° C. to about 50° C. or higher with a temperature within the range of from about 20° C. to about 30° C. being most often employed. Heat is evolved when the contact takes place, and as a result, cooling may be necessary. The resulting slurry is stirred or agitated for a sufficient time, generally within the range of about 15 minutes to about 5 hours to insure that complete contact takes place. The resulting solid catalyst is recovered by filtration, decantation, or the like, and then washed with a suitable material such as n-pentane, n-heptane, cyclohexane, benzene, xylene or the like to remove any soluble material which may be present.

The mole ratio of the transition metal compound to the organoaluminum halide employed in the contact therewith can vary over a relatively broad range. Generally, the mole ratio of the transition metal to the organoaluminum halide is within the range of from 10:1 to 1:10, and more preferably within a range of about 2:1 to about 1:3.

The catalyst produced as described above can additionally be contacted and reacted with one or more activating agents, i.e., halide containing compounds of metals of groups IVA and VA of the Periodic Table. Examples of particularly preferred such halide ion exchanging activating agents are chlorine-containing compounds of silicon, germanium, tin, phosphorous, and carbon. Typical examples include carbon oxychloride, phosphorous trichloride, silicon tetrachloride, stannous chloride, carbon tetrachloride and acid chlorides of the formula R′COCl where R′ is an aliphatic or aromatic radical, preferably containing 1 to 20 carbon atoms. Other suitable halogen-containing compounds include chlorosiloxanes, chlorinated silanes and the like. In a particularly preferred embodiment, a chlorine-containing silicon compound or an organosilane is employed in combination with titanium tetrachloride as the activating agent. Examples of silicon compounds include silicon tetrachloride, a chlorinated silane of the formula $SiHCl_3$ and chlorinated organosilanes of the formula $\phi SiHCl_2$ and $\phi_2 SiCl_2$, wherein $\phi$ is a phenyl radical. Preferably, the catalyst produced after reaction with the organoaluminum halide as described above is contacted with an activating agent comprised of titanium tetrachloride and a silicon compound selected from silicon chloride, a chlorinated silane of the formula $SiHCl_3$, or a mixture of said silicon compounds. The reaction with the activating agent can be carried out in a liquid medium in which the activating agent components are soluble, e.g., a liquid hydrocarbon such as n-pentane, n-heptane, cyclohexane, benzene and xylene. Generally, the contact is carried out at a temperature in the range of from about 0° C. to about 200° C., preferably 100° C., for a time period in the range of from about 10 minutes to 10 hours. The weight ratio of the activating agent to the catalyst is generally within a range of about 10:1 to about 1:10 and usually from about 7:1 to about 1:4. Following the contact with the activating agent solution, excess solution is removed by washing the catalyst with additional solvent and storing the catalyst in the solvent or after drying, storing the catalyst under dry nitrogen.

In using the improved high activity catalyst of this invention for the polymerization of olefins, a cocatalyst of the organometallic type is preferably used in combination therewith. Suitable such organometallic cocatalysts include organoaluminum compounds, with the most preferred cocatalysts being organoaluminum compounds of the formula $R_3Al$ including, for example, trimethylaluminum, triethylaluminum, triisopropylaluminum, tridecylaluminum, triecosylaluminum, tricyclohexylaluminum, triphenylaluminum, and the like. Triethylaluminum is preferred since it has been found to produce excellent results. The mole ratio of the cocatalyst to the transition metal compound in the catalyst of this invention can vary over a relatively broad range. Generally, the mole ratio of the cocatalyst to the transition metal compound contained in the catalyst of the present invention is within a range of about 1:1 to about 1500:1.

The polymerization process using the catalysts of the present invention can be conducted in a liquid phase, in liquid monomer, in the presence or absence of inert hydrocarbon diluent or in a gas phase. The polymerization can be performed in a batch process or continuously. In a batch process, a stirred reactor is first purged with nitrogen and then with a hydrocarbon such as isobutane. A catalyst of the present invention and cocatalyst, if used, are charged to the reactor, and hydrogen if used, is added. A diluent such as isobutane is added to the reactor, and the reactor is heated to the desired reaction temperature, e.g., for ethylene a temperature within the range of about 50° C. to about 102° C. The monomer or monomers to be polymerized are then charged to the reactor and maintained at a partial pressure within the range of from about 0.5 MPa to about 5.0 MPa (70-725 psig). At the end of the reaction period, the reaction is terminated and unreacted monomer and isobutane are vented. The polymerized olefin product is collected as a free-flowing white solid, dried, etc. In a continuous process, a suitable reactor such as a loop reactor is continuously charged with diluent, catalyst, cocatalyst, polymerizable monomer and hydrogen, and polymerized product is continuously withdrawn and recovered.

The polymers produced using the catalyst of the present invention are generally characterized by high strength, uniformity of size and low level of residual catalyst. The polymers are produced in high productivity with low levels of fines. In a particle-form polymerization polymer, particles are obtained that like the catalyst precursor are shaped like dipyramidal or generally football-shaped crystals.

In order to further illustrate the catalysts and methods of the present invention, the following examples are given.

EXAMPLE 1

Particulate pillared clay material was prepared by stirring about 1 part by weight bentonite clay with from about 5 to about 40 parts by weight of an aqueous solution containing 2.3% by weight of solution of an aluminum chlorohydroxide complex obtained from the Reheis Chemical Company of Berkeley Heights, N.J. under the trademark Chlorhydrol®. Chlorhydrol® is a 50% by weight aqueous solution of an aluminum chloride complex of the approximate formula $[Al_{13}(O)_4(OH)_{24}(H_2O)_{12}]Cl_7$. The molecular weight of the complex is about 1040. The weight ratio of smectite clay to Chlorhydrol® utilized in forming the pillared clay material was about 3 to 1.

In a first preparation, 150 ml (209.25 g) of Chlorhydrol® was dissolved with stirring in 9 L (about 8980 g) of distilled water prewarmed to about 60° C. To the resulting solution was added 300 g of bentonite clay, and the slurry was stirred at 60° C. for about 2 hours. After termination of the stirring, the treated clay was allowed to settle overnight at 60° C. after which the clay was recovered by filtration. The filter cake was washed with about 600 ml of distilled water and then dried overnight (about 15 hours) at a temperature of about 100° C. in a circulating air oven. The dried product was divided into two equal portions; the first (pillared clay A) was calcined in air at a temperature of 325° C. for two hours. The second portion (pillared clay B) was calcined for in air at a temperature of 500° C. for 2 hours. The surface area (BET) of pillared clay A was about 123 m²/g and the surface area of pillared clay B was about 120 m²/g.

In a second pillared clay preparation, 600 g of bentonite clay was added to a pillaring solution consisting of 17.7 L (about 17,660 g) of distilled water at a temperature of about 45° C. and 300 ml (418.5 g) of Chlorhydrol® The mixture was stirred and heated to about 60° C. for about 2.4 hours. The resulting clay product was recovered by filtration and was aged for about 48 hours at room temperature (about 23° C.). The aged wet clay product was then re-disbursed into distilled water, heated to 60° C. and stirred for an additional 2½ hours at 60° C. The resulting clay product was then recovered by filtration, dried in an air circulation oven at 100° C. for about 72 hours and then calcined at 500° C. for 2 hours. This pillared clay is designated pillared clay C. Pillared clay C had a surface area of about 198 m²/g.

In a third preparation, the procedure described above in connection with pillared clay C was followed except that aging was not employed. Instead, the filtered cake in an amount of about 1.2 kg was slurried in 14 kg of distilled water, and the resulting slurry was spray dried. A portion of the spray dried clay product was calcined in air at a temperature of 500° C. for a time period of about 2 hours. The pillared clay obtained was designated as pillared clay D, and it had a surface area of about 246 m²/g. All of the pillared clay produced as described above were ground to particles of less than about 100 mesh in size.

A control particulate diluent material designated as E was comprised of aluminum oxide ($Al_2O_3$) minispheres commercially available from the Davison Chemical Company as grade SRA. The aluminum oxide minispheres had a surface area of from about 260 m²/g to about 320 m²/g and a pore volume of about 1 cc/g. Prior to use the aluminum oxide minispheres were calcined in air at a temperature of 200° C. for about 4 hours.

Control particulate diluent material F was a commercially available Ketjen silica support. It was calcined in air at a temperature of 600° C. for about 4 hours.

EXAMPLE 2

A series of olefin polymerization catalysts was prepared using control particulate materials E and F and pillared clay C. The catalysts were prepared under argon in separate 1 quart (0.9 L) glass beverage bottles by charging each bottle with 0.04 mole of particulate anhydrous magnesium dichloride, 0.04 mole of distilled water and 300 mL of commercial reagent quality mixed xylenes. The mixtures were stirred for about 3 days at 23° C., and then 0.02 mole of titanium tetra-n-butoxide [Ti(OBu)4] and 0.02 mole of phenol were added to each bottle. While continuing the stirring, each mixture was heated at 100° C. for about 1 hour to obtain a solution. To each of the hot solutions was added a quantity of a pillared clay or a control particulate diluent material, and the resulting mixtures were stirred for about 10 to 15 minutes and allowed to cool to about 25° C. Each mixture was then treated dropwise with 25 mL (0.01 mole) of ethylaluminum sesquichloride (EASC) as a 25% by weight solution in n-heptane to produce a solid which settled out quickly upon ceasing stirring. The solid, designated catalyst precursor A, was isolated from the reaction mixture by centrifugation, washed with n-hexane to remove unreacted and/or soluble byproducts and dried by standing overnight in an argon atmosphere. A 5 g portion of each precursor A was activated for polymerization by contact with from about 20 to 30 mL of a 3-component halide compound mixture at 100° C. for about 1 hour. The 3-component halide compound mixture was comprised of 50% by volume titanium chloride (TiCl4), 40% by volume of a chlorinated silane having the formula SiHCl3 and 10% by volume silicon chloride (SiCl4). The weight ratio of the halide compound mixture to initial magnesium dichloride used in preparing each precursor A ranged from about 8:1 to about 10:1. The resulting particulate catalysts were isolated by suction filtration, washed with n-hexane and dried. The catalysts, the weights and types of particulate diluent employed, the weights of precursor A employed and the calculated percents by weight of particulate diluent and active catalyst contained in each of the catalysts are given in Table I below.

TABLE I

| Catalyst No. | Solid Diluent | | | | Precursor A Wt, g | Isolated Catalyst[a] | | | |
|---|---|---|---|---|---|---|---|---|---|
| | Type | Designation | Wt. g. | Calcination Temp. °C. | | Wt, g | Calc. Wt. Diluent, g | Calc. Wt. % Diluent | Cat. |
| 1 | Al2O3 | E | 20.0 | 200 | 28.8 | 4.6 | 3.2 | 70 | 30 |
| 2 | Silica | F | 13.95 | 600 | 23.8 | 5.0 | 2.9 | 58 | 42 |
| 3 | Pillared Clay | C | 20.0 | 500 | 22.5 | 5.1 | 4.5 | 88 | 12 |

[a]Based on employing 5.0 g of the corresponding precursor A.

Propylene polymerizations utilizing the catalysts of Table I were conducted in 1 L stirred, stainless steel reactors at 70° C. for 1 hour in the presence of 25 psi hydrogen. The weight of the catalysts utilized are given in Table II below, and unless indicated to the contrary, a cocatalyst consisting of 2.0 mmoles of the triethylaluminum premixed with 1.1 mmoles of ethyl anisate and 2.0 mmoles of diethylaluminum chloride was used with each catalyst. In each polymerization, the polypropylene produced in the reactor was recovered, stabilized with conventional antioxidants and dried. Xylene and propylene solubles tests were performed on the polypropylene as follows. A 1 gram sample of polymer was placed in a 100 mL centrifuge tube containing 100 mL of xylene or propylene. The tube was then placed in a heater-evaporator and maintained at 140° C. for 15 minutes while stirring occasionally. After the 15 minute heating was completed, the tube was removed from the heater-evaporator and allowed to cool, at room temperature for 15 minutes, followed by cooling in an ice bath for 30 minutes. The tube was then placed in a centrifuge and centrifuged at approximately 1900 rpm for 15 minutes. The tube was removed from the centrifuge and 25 mL of the supernatant liquid was removed to an aluminum dish which had previously been weighed while empty. The dish containing the liquid was heated for 30 minutes, then was allowed to cool, and subsequently reweighed. The weight percent solubles was calculated according to the equation:

$$\% \text{ solubles} = \frac{4A \times 100}{S},$$

where

A = grams of polymer in aluminum dish, and
S = grams of original polymer sample.

The calculated productivity of each catalyst, the weight percent solubles in the polymer produced using the catalyst, and the melt flow, density and flexural modules of the polymer were determined. The results of these tests are given in Table II below.

TABLE II

| Cat. No. | Weight, mg | | Calculated Productivity, g/g/hr[a] | | Wt. % Solubles[c] | | Melt Flow[d] g/10 min | Density[e] g/cc | Flex Mod.[f] MPa |
|---|---|---|---|---|---|---|---|---|---|
| | Total Cat. | Excluding Solid Diluent | Total Catalyst | Excluding Solid Diluent | Propylene | Xylene | | | |
| 1 | 40.3 | 12.3 | 935 | 3,065 | 3.7 | 5.6 | — | — | — |
| 2 | 716.4 | 300.9 | 20.4 | 48.5 | 6.2 | 6.5 | — | — | — |
| 3 | 45.7 | 5.39 | 1250 | 10,580 | 2.3 | 6.0 | — | — | — |

TABLE II-continued

| Cat. No. | Weight, mg | | Calculated Productivity, g/g/hr[a] | | Wt. % Solubles[c] | | Melt Flow[d] g/10 min | Density[e] g/cc | Flex Mod.[f] MPa |
|---|---|---|---|---|---|---|---|---|---|
| | Total Cat. | Excluding Solid Diluent | Total Catalyst | Excluding Solid Diluent | Propylene | Xylene | | | |
| 3[b] | 39.5 | 4.66 | 4350 | 36,870 | 0.65 | 11 | 4.0 | — | 1087 |

[a]Based on polymer recovered from reactor excluding propylene-soluble polymer.
[b]The cocatalyst employed 1 mmole of 2,2,6,6-tetramethylpiperidine instead of 1.1 mmole of ethyl anisate.
[c]Solubles tests are described herein.
[d]ASTM D 1238, Condition L
[e]ASTM D 1505
[f]ASTM D 790

Catalysts 1 and 2 are control catalysts and catalyst number 3 is a catalyst of the present invention. The calculated productivity values given in Table II, based on either the total particulate catalyst or the portion excluding the particulate diluent thereof, clearly show the control catalysts to be of lower productivities than the pillared clay catalyst of the present invention, i.e., catalyst 3. Also as shown in Table II, the replacement of the ethyl anisate component of the cocatalyst with a 2,2,6,6-tetramethylpiperidine component increased productivity by a factor of about 3.5. At the same time, the propylene solubles in the polymer were reduced by about ⅔ while the xylene solubles were approximately doubled. In addition, the inventive catalyst produced polymer particles which had generally dipyramidal or "football" crystal like morphology, an improvement in polymer particle size and shape. Some of the polymer particles had the appearance of fused "football" shaped crystals.

EXAMPLE 3

Another series of catalysts was prepared following the procedures set forth in Example 1, but using the pillared clays A, B and D. The catalysts are described in Table III set forth below.

TABLE III

| Catalyst No. | Solid Diluent | | Calcination Temp. °C. | Precursor A Wt, g | Isolated Catalyst[a] | | | |
|---|---|---|---|---|---|---|---|---|
| | Type | Designation | | | Wt, g | Calc. Wt. Diluent, g | Calc. Wt. % | |
| | | | | | | | Diluent | Cat. |
| 4 | Pillared Clay | D | 500 | 26.1 | 4.8 | 3.7 | 77 | 23 |
| 5 | Pillared Clay | A | 350 | 22.8 | 5.0 | 4.4 | 88 | 12 |
| 6 | Pillared Clay | B | 500 | 23.0 | 3.9 | 3.4 | 87 | 13 |

[a]Based on employing 5.0 g of the corresponding precursor A.

Propylene polymerizations were conducted utilizing the catalysts of Table III under the same conditions and following the procedures as set forth in Example 2 above. The results obtained are given in Table IV below.

TABLE IV

| Cat. No. | Weight, mg | | Calculated Productivity, g/g/hr[a] | | Wt. % Solubles[c] | | Melt Flow[d] g/10 min | Flex Mod.[e] MPa |
|---|---|---|---|---|---|---|---|---|
| | Total Cat. | Excluding Solid Diluent | Total Catalyst | Excluding Solid Diluent | Propylene | Xylene | | |
| 4[b] | 79.9 | 18.3 | 395 | 1727 | 2.6 | 2.1 | 8.4 | 1742 |
| 5[b] | 127.6 | 15.3 | 205 | 1712 | 1.6 | 5.6 | — | — |
| 6[b] | 122.8 | 15.7 | 473 | 3700 | 2.1 | 3.5 | 35 | 1423 |

[a]Based on polymer recovered from reactor excluding propylene-soluble polymer.
[b]The cocatalyst employed was the TEA-EA-DEAC cocatalyst described in Example 2.
[c]Solubles tests are described in Example 2.
[d]ASTM D 1238, Condition L
[e]ASTM D 790

The results given in Tables II and IV demonstrate that the pillared clay based catalysts of the present invention are active propylene polymerization catalysts. Catalyst 4 was produced using spray drying the pillared clay and calcination at 500° C. Although it exhibited only about ⅓ to 1/6 the productivity of catalyst 3, it also produced only about ⅓ as much xylene soluble polymer. The benefits of aging the catalyst and calcining the catalyst at 500° C. are shown by comparing the results using catalyst 3 (aged) with the results using catalyst 4 (not aged), and comparing catalyst 5 (calcined at 325° C.) with catalyst 6 (calcined at 500° C.). Catalyst 3 resulted in much higher productivity than catalyst 4. Catalyst 6 resulted in about double the productivity of catalyst 5 while the xylene solubles in the polymer decrease from about 5.5 to about 3.5 weight percent.

Thus, the present invention is well adapted to carry out the objects and obtain the ends and advantages mentioned as well as those inherent therein. While numerous substitutions of equivalent components and changes in the arrangement of steps may be made by those skilled in the art, such changes are encompassed within the spirit of this invention as defined by the appended claims.

That which is claimed is:

1. A method of producing a high activity olefin polymerization catalyst comprising:

(a) contacting a pillared clay with the soluble complex produced from the combination of a mixture of a metal dihalide with at least one transition metal compound in the presence of a liquid diluent to produce a solid, said pillared clay being present in an amount in the range of from about 0.1% to about 30% by weight based on the weight of said soluble complex; and (b) contacting said solid produced in step (a) with an organoaluminum halide in an amount in the range of from about 0.1 mole to about 10 moles per mole of transition metal compound in said solid to produce said catalyst.

2. The method of claim 1 wherein said pillared clay is prepared by reacting smectite clay with an aqueous solution of a polymeric cationic hydroxy metal complex and calcining the resulting reaction product.

3. The method of claim 1 wherein said metal dihalide is magnesium dichloride.

4. The method of claim 3 wherein said transition metal compound is a titanium alkoxide of the formula Ti(OR)$_4$ wherein each R is independently a hydrocarbon radical containing in the range of from 1 to about 20 carbon atoms.

5. The method of claim 4 wherein said mixture of metal dihalide and transition metal compound is heated in the presence of a xylene diluent at a temperature in the range of from about 15° to about 100° C. for a time period in the range of from about 5 minutes to about 10 hours.

6. The method of claim 1 wherein the ratio of metal dihalide to transition metal compound in step (a) is in the range of from about 10:1 to about 1:10.

7. The method of claim 2 wherein said polymeric cationic hydroxy metal complex is an aluminum chlorohydroxide complex and said reaction product is calcined in air at a temperature of about 500° C. for a time period of about 2 hours.

8. The method of claim 1 wherein said soluble complex of step (a) is produced by heating a mixture of metal dihalide, at least one transition metal compound and an aromatic compound in the presence of a liquid diluent.

9. The method of claim 8 wherein said aromatic compound is phenol, said liquid diluent is xylene and said heating is at a temperature in the range of from about 15° C. to about 100° C. for a time period in the range of from about 5 minutes to about 10 hours.

10. The method of claim 1 which is further characterized to include the additional step of contacting said catalyst with an activating agent comprising a titanium halide and a silicon compound selected from a silicon halide, a halogenated silane of the formula SiHX$_3$ wherein X is a halogen and mixtures of said silicon compounds.

11. An olefin polymerization catalyst produced in accordance with the method of claim 1.

12. An olefin polymerization catalyst produced in accordance with the method of claim 2.

13. An olefin polymerization catalyst produced in accordance with the method of claim 5.

14. An olefin polymerization catalyst produced in accordance with the method of claim 7.

15. An olefin polymerization catalyst produced in accordance with the method of claim 9.

16. An olefin polymerization catalyst produced in accordance with the method of claim 10.

17. A method of polymerizing olefins comprising contacting at least one olefin under polymerization conditions with a catalyst produced by:

(a) contacting a pillared clay with the soluble complex produced from the combination of a mixture of a metal dihalide with at least one transition metal compound in the presence of a liquid diluent to produce a solid, said pillared clay being present in an amount in the range of from about 0.1% to about 30% by weight based on the weight of said soluble complex; and (b) contacting said solid produced in step (a) with an organoaluminum halide in an amount in the range of from about 0.1 mole to about 10 moles per mole of transition metal compound in said solid to produce said catalyst.

18. The method of claim 17 wherein said pillared clay is prepared by reacting smectite clay with an aqueous solution of a polymeric cationic hydroxy metal complex and calcining the resulting reaction product.

19. The method of claim 17 wherein said metal dihalide is magnesium dichloride.

20. The method of claim 19 wherein said transition metal compound is a titanium alkoxide of the formula Ti(OR)$_4$ wherein each R is independently a hydrocarbon radical containing in the range of from about 1 to about 20 carbon atoms.

21. The method of claim 20 wherein said mixture of metal dihalide and transition metal compound is heated in the presence of a xylene diluent at a temperature in the range of from about 15° C. to about 100° C. for a time period in the range of from about 5 minutes to about 10 hours.

22. The method of claim 17 wherein the ratio of metal dihalide to transition metal compound in step (a) is in the range of from about 10:1 to about 1:10.

23. The method of claim 18 wherein said polymeric cationic hydroxy metal complex is an aluminum chlorohydroxide complex and said reaction product is calcined in air at a temperature of about 500° C. for a time period of about 2 hours.

24. The method of claim 17 wherein said soluble complex of step (a) is produced by heating a mixture of metal dihalide, at least one transition metal compound and an aromatic compound in the presence of a diluent.

25. The method of claim 24 wherein said aromatic compound is phenol, said diluent is xylene and said heating is at a temperature in the range of from about 15° C. to about 100° C. for a time period in the range of from about 5 minutes to about 10 hours.

26. The method of claim 17 which is further characterized to include the additional step of contacting said catalyst with an activating agent comprising a titanium halide and a silicon compound selected from a silicon halide, a halogenated silane of the formula SiHX$_3$ wherein X is a halogen and mixtures of said silicon compounds.

27. The method of claim 22 which is further characterized to include the additional step of contacting said catalyst with an activating agent comprising a titanium chloride and a silicon compound selected from silicon chloride, a chlorinated silane of the formula SiHCl$_3$ and mixtures of said silicon compounds.

* * * * *